United States Patent
Buccafusca et al.

(10) Patent No.: US 8,356,517 B2
(45) Date of Patent: Jan. 22, 2013

(54) INTEGRATED OPTICAL AND ACOUSTIC TRANSDUCER DEVICE

(75) Inventors: Osvaldo Buccafusca, Fort Collins, CO (US); David Martin, Fort Collins, CO (US)

(73) Assignee: Avago Technologies Wireless IP (Singapore) Pte. Ltd., Singapore (SG)

( * ) Notice: Subject to any disclaimer, the term of this patent is extended or adjusted under 35 U.S.C. 154(b) by 341 days.

(21) Appl. No.: 12/711,626

(22) Filed: Feb. 24, 2010

(65) Prior Publication Data

US 2011/0203378 A1    Aug. 25, 2011

(51) Int. Cl.
*G01N 29/24* (2006.01)
*G01N 21/01* (2006.01)
*G01N 29/34* (2006.01)

(52) U.S. Cl. ........... 73/601; 73/643; 600/476; 600/427; 385/13

(58) Field of Classification Search ............ 73/601, 73/643; 600/467, 476, 427, 439; 356/477, 356/482; 250/227.18; 385/12–13
See application file for complete search history.

(56) References Cited

U.S. PATENT DOCUMENTS

| | | | |
|---|---|---|---|
| 4,348,075 A | 9/1982 | Gottlieb et al. | |
| 5,191,328 A * | 3/1993 | Nelson | 340/870.06 |
| 5,652,808 A | 7/1997 | Duchet et al. | |
| 7,197,931 B2 * | 4/2007 | Kim | 73/587 |
| 7,303,530 B2 | 12/2007 | Barnes et al. | |
| 7,463,364 B2 | 12/2008 | Yacoubian | |
| 2001/0050677 A1 * | 12/2001 | Tosaya | 345/179 |
| 2001/0055435 A1 * | 12/2001 | Biagi et al. | 385/7 |
| 2006/0272418 A1 * | 12/2006 | Maris et al. | 73/606 |
| 2008/0161696 A1 * | 7/2008 | Schmitt et al. | 600/467 |
| 2009/0043191 A1 * | 2/2009 | Castella et al. | 600/425 |
| 2009/0147344 A1 | 6/2009 | Lovering et al. | |
| 2011/0036171 A1 * | 2/2011 | Maris et al. | 73/606 |

OTHER PUBLICATIONS

Co-pending U.S. Appl. No. 12/430,966, filed Apr. 28, 2009.

* cited by examiner

*Primary Examiner* — Peter Macchiarolo
*Assistant Examiner* — Rose M Miller

(57) ABSTRACT

An integrated transducer device includes an optical transducer and an acoustic transducer integrally joined with the optical transducer. The acoustic transducer includes a membrane responsive to acoustic signals, the membrane being aligned with the optical transducer such that optical signals emitted or received by the optical transducer pass through the membrane. A propagation direction of the acoustic signals emitted or received by the acoustic transducer is collinear with a propagation direction of the optical signals emitted or received by the optical transducer.

20 Claims, 3 Drawing Sheets

INTEGRATED OPTICAL AND ACOUSTIC TRANSDUCER DEVICE

BACKGROUND

Transducers are devices that covert one type of energy into another. Acoustic transducers in particular convert electrical signal to acoustic signals (sound waves) in a transmit mode (e.g., a speaker application), and/or convert received acoustic waves to electrical signals in a receive mode (e.g., a microphone application). Similarly, optical transducers convert electrical signal to optical signals (light) in a transmit mode (e.g., a light source application), and/or convert received optical signals to electrical signals in a receive mode (e.g., a light sensor application).

Dual sensing applications require both acoustic and optical sensing using both acoustic and optical transducers. For example, a paper/document feeder typically includes an acoustic sensing system that determines thicknesses of paper to avoid jamming, and an optical sensing system that detects edges of paper. In this case, two separate sets of transducers are required. A set of acoustic transducers includes transmitting acoustic transducers that send ultrasonic signals and sensing acoustic transducers that receive those ultrasonic signals, e.g., for determining paper thickness. Similarly, a set of optical transducers includes transmitting optical transducers, such as light emitting diodes (LEDs) or laser diodes, that send optical signals and sensing optical transducers, such as photodiodes, that receive the transmitted optical signals, e.g., for determining paper edges. The implementation of multiple transducer systems requires additional space and is generally inefficient.

SUMMARY

In a representative embodiment, an integrated transducer device includes an optical transducer and an acoustic transducer integrally joined with the optical transducer. The acoustic transducer includes a membrane responsive to acoustic signals, the membrane being aligned with the optical transducer such that optical signals emitted or received by the optical transducer pass through the membrane.

In another representative embodiment, an integrated transducer device includes an optical transducer device and an acoustic transducer device. The optical transducer device is configured to at least one of emit or receive optical signals, and includes a first substrate and an optical transducer positioned on the first substrate. The acoustic transducer device is configured to at least one of emit or receive acoustic signals, and includes a second substrate defining a cavity and an acoustic transducer positioned on the second substrate, the second substrate being stacked on the first substrate such that the optical transducer is positioned within the cavity. The acoustic transducer a membrane positioned on the second substrate over the cavity, and an annular piezoelectric film stack positioned on the membrane and defining a center opening, exposing at least a portion of the membrane. The optical signals pass through the exposed portion of the membrane.

In another representative embodiment, an integrated transducer device includes an acoustic transducer device and an optical transducer device. The acoustic transducer device is configured to at least one of emit or receive acoustic signals, and includes a first substrate defining a first cavity and an acoustic transducer positioned on the first substrate. The optical transducer device is configured to at least one of emit or receive optical signals, and includes a second substrate defining a second cavity and an optical transducer positioned on the second substrate above the second cavity, the second substrate being stacked on the first substrate. The acoustic transducer includes a membrane positioned on the first substrate over the first cavity, and an annular piezoelectric film stack positioned on the membrane within the second cavity and defining a center opening, exposing at least a portion of the membrane. At least a portion of the optical transducer is aligned with the center opening such that the optical signals pass through the second cavity and the exposed portion of the membrane.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1A:
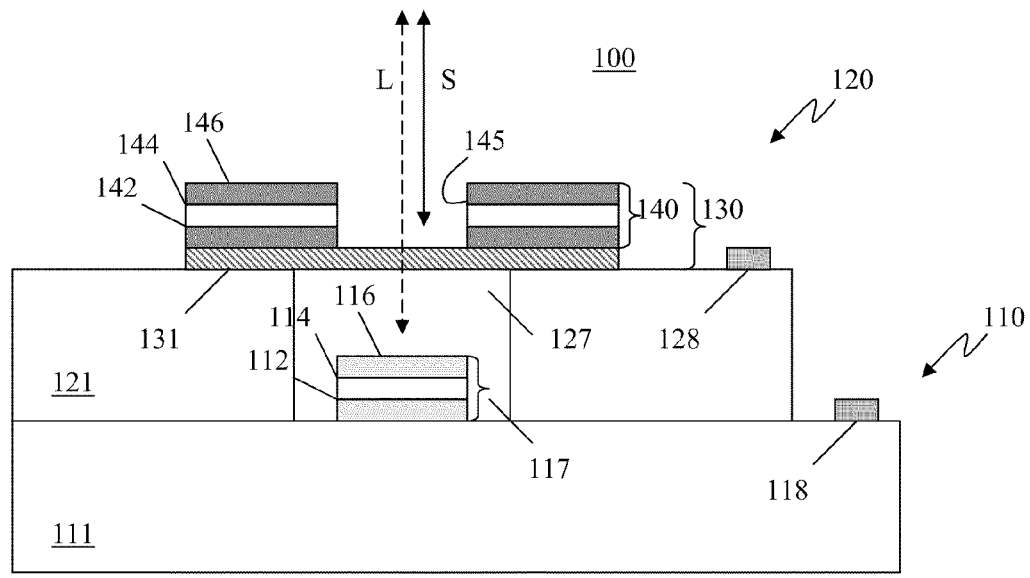
FIG. 1A is a cross-sectional diagram illustrating an integrated transducer device, according to a representative embodiment.

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the present teachings.

Generally, it is understood that the drawings and the various elements depicted therein are not drawn to scale. Further, relative terms, such as "above," "below," "top," "bottom," "upper," "lower," "left," "right," "vertical" and "horizontal," are used to describe the various elements' relationships to one another, as illustrated in the accompanying drawings. It is understood that these relative terms are intended to encompass different orientations of the device and/or elements in addition to the orientation depicted in the drawings. For example, if the device were inverted with respect to the view in the drawings, an element described as "above" another element, for example, would now be "below" that element. Likewise, if the device were rotated 90 degrees with respect to the view in the drawings, an element described as "vertical," for example, would now be "horizontal."

According to various embodiments, a monolithically integrated transducer device includes a stacked optical transducer and acoustic transducer, for example, using a direct or indirect wafer bonding process. The acoustic transducer includes a membrane that is transparent to light or has a small aperture aligned with the optical transducer for passing light. Accordingly, the integrated transducer device is able to transmit and/or receive acoustic (e.g., ultrasonic) and optical signals, which have collinear corresponding propagation directions. The integrated transducer device may therefore provide acoustic and optical functionality from a single location.

Figure 1B:
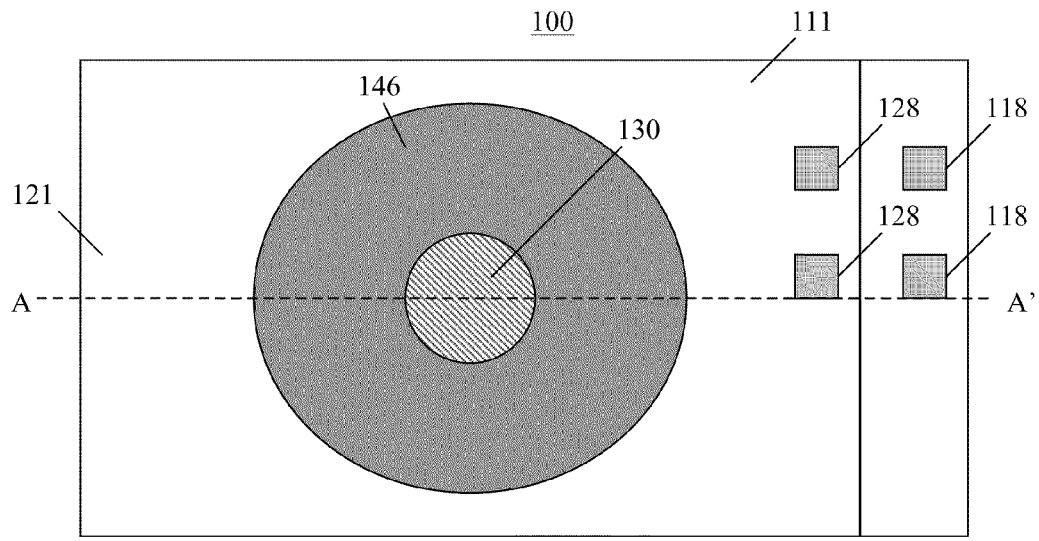
FIG. 1B is a top plan view illustrating an integrated transducer device, according to a representative embodiment.

FIG. 1A is a cross-sectional diagram illustrating an integrated transducer device, and FIG. 1B is a top plan view illustrating the integrated transducer device of FIG. 1A, according to a representative embodiment. More particularly, FIG. 1A shows a cross-sectional view of the transducer device depicted in FIG. 1B, taken along line A-A', according to a representative embodiment.

Referring to FIGS. 1A and 1B, integrated transducer device 100 includes vertically stacked optical transducer device 110 and acoustic transducer device 120. In the depicted embodiment, the integrated transducer device 100 is configured for top emission and/or reception of optical signals L and acoustic signals S, the propagation directions of which are collinear or substantially collinear.

The optical transducer device 110 includes substrate 111 and optical transducer 117 mounted on the substrate 111, or grown through various semiconductor processes, such as sputtering, metal vapor deposition or the like. The substrate 111 may be formed of various types of materials, including an insulating material, such as glass, sapphire, alumina or the like, or any semiconductor material compatible with semiconductor processes, such as silicon, gallium arsenide (GaAs), indium phosphide (InP) or the like. A semiconductor material is useful for integrating connections and electronics, thus reducing size and cost. Although shown as a singulated die including the optical transducer 117, it is understood that the substrate 111 may be part of a wafer containing multiple dies.

The optical transducer 117 may be any type of transducer configured to receive and/or send optical signals, including an LED, a laser diode, a photodiode, a photoresistor, a vertical cavity laser, or the like, e.g., depending on whether the optical transducer 110 is designed to transmit or receive optical signals, or both, as would be apparent to one of ordinary skill in the art. The depicted representative embodiment shows the optical transducer 117 configured as an LED, for example, having first doped layer 112, active region 114 and second doped layer 116 stacked on the substrate 111. The first doped layer 112 may be an n+ type layer corresponding to a cathode and the second doped layer 116 maybe a p+ type layer corresponding to an anode of the LED, for example. The active region 114 may be a simple intrinsic area or a quantum well area (for increased efficiency), for example.

Each of the first and second doped layers 112 and 116 are electrically connected to external circuitry via corresponding contact pads, indicated by representative contact pads 118 formed on a top surface of the substrate 111. The contact pads 118 may be formed of a conductive material, such as gold, gold-tin alloy, or the like. The contact pads 118 may electrically connect with the first and second doped layers 112 and 116 of the optical transducer 117 through various electronic circuits (not shown), such as connectors passing through vias formed in the substrate 111 and/or the substrate 121, trace patterns, and the like. The contact pads 118 may likewise be used to wire bond the optical transducer device 110 to a package.

As stated above, in various embodiments, the optical transducer 117 may be any other type of transducer configured to receive and/or send optical signals, without departing from the scope of the present teachings. For example, the optical transducer 117 may be a PIN photodiode, in which case an n type layer (114) is positioned between an n+ type first doped layer (112) and a p+ type second doped layer (116). In another example, the optical transducer 117 may be a vertical-cavity surface-emitting laser (VCSEL), in which case an active region (114) includes an active area between top and bottom Bragg reflectors (not shown), and is positioned between an n+ type first contact layer (112) and a p+ type second contact layer (116). The active area may be a multiple quantum well region formed of undoped GaAs or aluminum gallium arsenide (AlGaAs) layers or formed of GaAs or indium gallium arsenide (InGaAs) layers, for example. Also, the bottom Bragg reflector may be an n-doped distributed Bragg Reflector formed from a stack of AlGaAs and GaAs layers (e.g., about 15-30 layers), and the top Bragg reflector may be a p-doped distributed Bragg Reflector formed from a stack of AlGaAs and GaAs layers (e.g., about 15-30 layers).

The acoustic transducer device 120 is mounted to the top surface of the optical transducer device 110 using any mounting technique compatible with semiconductor processes, examples of which are discussed below, or grown through various semiconductor processes, such as sputtering, metal vapor deposition or the like. The acoustic transducer device 120 includes substrate 121, and a thin plate or membrane 131 and piezoelectric film stack 140 grown using semiconductor processes. A cavity 127 is fabricated under the membrane 131 by etching processes, such as dry etch or wet etch, for example. The substrate 121 may be formed of various types of materials, including an insulating material, such as glass, sapphire, alumina or the like, or any semiconductor material compatible with semiconductor processes, such as silicon, GaAs, InP, or the like. Although shown as a singulated die including the acoustic transducer 130, it is understood that the substrate 121 may be part of a wafer containing multiple dies. In an embodiment, the substrate (or wafer) 121 is made of the same material as the substrate (or wafer) 111 to avoid thermal expansion mismatch problems.

The acoustic transducer device 120 is substantially aligned with the optical transducer device 110 such that the optical transducer 117 mounted on the top surface of the substrate 111 is positioned within the cavity 127 and the optical signals L emitted and/or received by the optical transducer pass through the membrane 131. In various embodiments, the substrates 111 and 121 may have self-aligning features to facilitate assembly.

The piezoelectric film stack 140 includes a first electrode 142, a piezoelectric layer 144 and a second electrode 146. In the depicted embodiment, the piezoelectric film stack 140 is substantially circular in shape, and forms an annular ring defining a center opening 145, through which a portion of a top surface of the membrane 131 is exposed. In alternative embodiments, the membrane 131 and/or the piezoelectric film stack 140 may be formed in different shapes, such as ovals, squares, rectangles and the like, without departing from the scope of the present teachings.

The membrane 131 is positioned on the substrate 121 over the cavity 127, which enables mechanical movement (e.g., vibration) of the exposed portion of the membrane 131, e.g., when the membrane 131 is actuated by piezoelectric film stack 140. The opening of the cavity 127 in the top surface of the substrate 121 may be substantially circular, for example, although it may have any of a variety of sizes and shapes, such as oval, square, rectangular and the like, without departing from the scope of the present teachings.

In the depicted embodiment, the membrane 131 is solid, in that it does not include any apertures or openings. Accordingly, to enable the optical signals L emitted or received by the optical transducer 117 to pass through or traverse the actual membrane 131 with minimal absorption or front wave distortion, the membrane 131 is formed of a material that is transparent or substantially transparent to the optical wavelength(s) of the optical signals L and is relatively thin. For example, if the optical signals L correspond to visible or infrared light, the membrane 131 may be formed of borosilicate glass (BSG) at a thickness of about 0.2 μm to about 2 μm, although the thickness may vary to provide unique benefits for any particular situation or to meet application specific design requirements of various implementations, as would be apparent to one skilled in the art. In addition, the membrane 131 and/or the piezoelectric film stack 140 enables mechanical movement or vibrations (at ultrasonic frequencies) in response to electrical and/or acoustic signals at the exposed portion of the membrane 131 through the cavity 127. In alternative embodiments, there is no membrane 131, in which case the piezoelectric layer 144 may extend over the opening 145, thus covering the cavity 127. Accordingly, the piezoelectric layer 144 is formed of a material transparent to allow the optical signals L to pass through.

In alternative embodiments, the membrane 131 may be formed of a material or otherwise have a structure and design for manipulating the optical signals L in a predetermined manner. For example, in various embodiments, the membrane 131 may be configured to diffract the optical signals L, randomly or at predetermined angle(s), or to shift polarization of the optical signals L, to provide unique benefits for any particular situation or to meet application specific design requirements of various implementations, as would be apparent to one skilled in the art.

In the representative embodiment depicted in FIG. 1A, the first electrode 142 is stacked on the top surface of the membrane 131, the piezoelectric layer 144 is stacked on a top surface of the first electrode 142, and the second electrode 146 is stacked on a top surface of the piezoelectric layer 144. The first and second electrodes 142 and 146 are formed of an electrically conductive material, such as molybdenum (Mo), tungsten (W), aluminum (Al), or the like, and the piezoelectric layer 144 is formed of a thin film of aluminum nitride (AlN), zinc oxide (ZnO), or other piezoelectric film compatible with semiconductor processes. The thicknesses of the electrodes and piezoelectric films may range from about 0.1 μm to about 2 μm, for example. A passivation layer (not shown) may be optionally included on top and side surfaces of the piezoelectric film stack 140 and/or the optical transducer 130, in order to protect the various layers from humidity, debris and contaminants. The passivation layer may be formed from silicon dioxide, silicon nitride, oxynitride, borosilicate glass (BSG), or the like.

The first and second electrodes 142 and 146 are electrically connected to external circuitry via corresponding contact pads, indicated by representative contact pads 128 formed on the top surface of the substrate 121. The contact pads 128 may be formed of a conductive material, such as gold, gold-tin alloy, or the like. The contact pads 128 may electrically connect with the first and second electrodes 142 and 146, respectively, through various electronic circuits (not shown), such as connectors passing through vias formed in the substrate 121, the substrate 111, trace patterns, and the like. The contact pads 128 may likewise be used to wire bond the acoustic transducer device 120 to a package.

In an acoustical transmit mode, electrical input signals (e.g., excitation signals) may be input to the first and/or second electrodes 142 and 146, via corresponding contact pads 128, and converted to a mechanical vibration (or resonance), such as acoustic signals S, having a frequency induced by the piezoelectric stack 140 and/or the membrane 131. In a receive mode, acoustic input signals S may be input to the piezoelectric stack 140 through the opening 145 and converted to a corresponding electrical output signal output by the first and/or second electrodes 142 and 146, via the respective contact pads 128. Similarly, in an optical transmit mode, electrical input signals (e.g., excitation signals) may be input to electrodes (not shown) of the optical transducer 117 via corresponding contact pads 118, and converted to optical signals L having a frequency corresponding to the input signal. In a receive mode, optical input signals L may be sensed by the optical transducer 117 through the opening 145, the membrane 131 and cavity 127, and converted to a corresponding electrical output signals output by the electrodes via the respective contact pads 118.

In an alternative embodiment, the optical transducer 117 is configured to emit and/or receive light from the bottom through the substrate 111. In this case, the substrate 111 is formed of a material that is transparent or substantially transparent to the optical wavelength(s) of the optical signals L. When the optical transducer 117 emits and/or receives light through the substrate 111, the membrane 131 need not be transparent to the optical signals L. However, if the membrane 131 is also transparent or substantially transparent, then the optical transducer 117 may be configured to emit and/or receive light through either or both the substrate 111 and the membrane 131, respectively.

The acoustic transducer device 120 may include an ultrasonic transducer fabricated using micro-electromechanical systems (MEMS) technology, for example, known as a micro-machined ultrasonic transducer (MUT). In this case, the membrane 131 moves or deforms at ultrasonic frequencies, which is translated into electrical signals available at the contact pads 128. In various embodiments, the translation may be made through a piezoelectric material, e.g., by the piezoelectric layer 144 and/or the membrane 131, in which case the transducer device is a piezoelectric micro-machined ultrasonic transducer (PMUT). In alternative embodiments, a capacitive transducer may be used to provide the translation through a capacitance variation, in which case the transducer device is capacitive micro-machined ultrasonic transducer (CMUT). It is understood that other types and arrangements of membranes and/or transducers may be incorporated in the piezoelectric film stack 140, without departing from the scope of the present teachings.

Figure 2A:
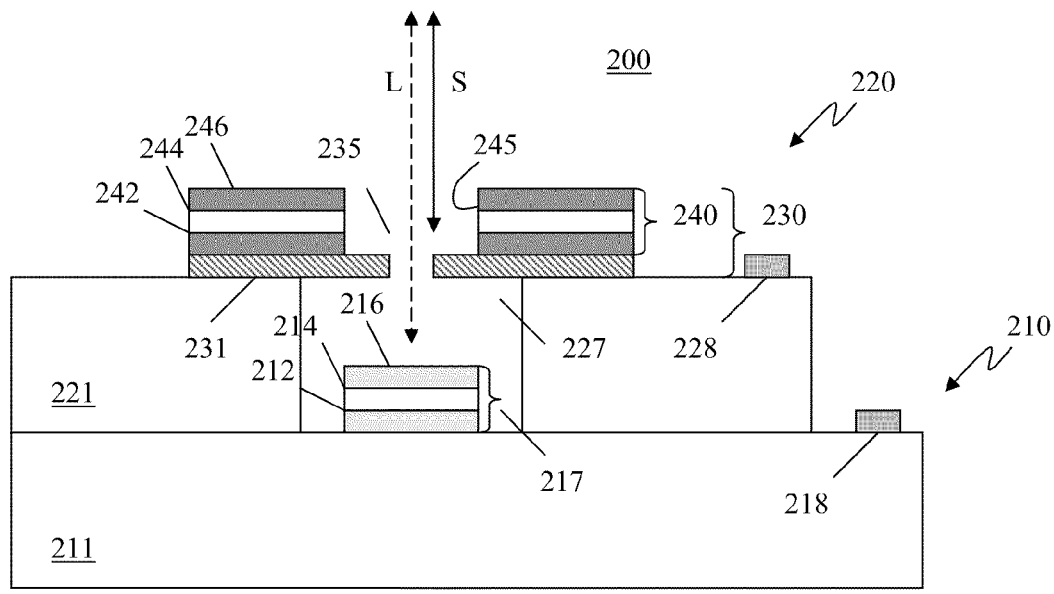
FIG. 2A is a cross-sectional diagram illustrating an integrated transducer device, according to another representative embodiment.
Figure 2B:
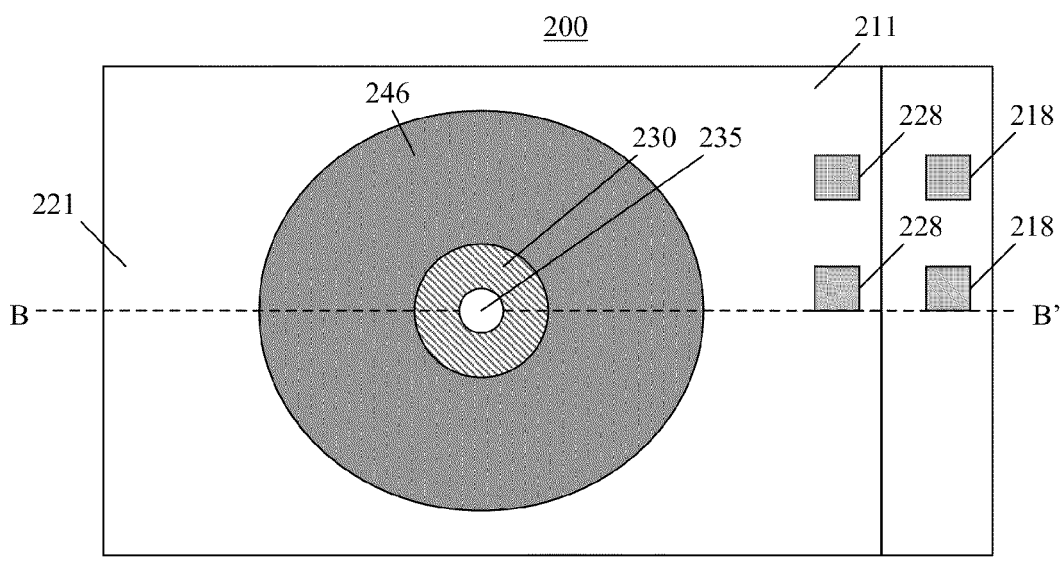
FIG. 2B is a top plan view illustrating an integrated transducer device, according to another representative embodiment.

FIG. 2A is a cross-sectional diagram illustrating an integrated transducer device, and FIG. 2B is as top plan view illustrating the integrated transducer device of FIG. 2A, according to another representative embodiment. More particularly, FIG. 2A shows a cross-sectional view of the transducer device depicted in FIG. 2B, taken along line B-B', according to a representative embodiment.

Referring to FIGS. 2A and 2B, integrated transducer device 200 includes vertically stacked optical transducer device 210 and acoustic transducer device 220. In the depicted embodiment, the integrated transducer device 200 is configured for top emission and/or reception of optical signals L and acoustic signals S, the propagation directions of which are collinear or substantially collinear. The integrated transducer device 200 differs from the integrated transducer device 100 in that the membrane 231 includes an aperture to enable passage of the optical signals L, as discussed below.

The optical transducer device 210 is substantially the same as the optical transducer device 110 shown in FIGS. 1A and 1B, so the descriptions of various details will not be repeated. Generally, the optical transducer device 210 includes substrate 211 and optical transducer 217 mounted on the substrate 211. The optical transducer 217 may be any type of transducer configured to receive and/or send optical signals, including an LED, a laser diode, a photodiode, a photoresistor, a vertical cavity laser, or the like, e.g., depending on whether the optical transducer 210 is designed to transmit or receive optical signals, or both. The depicted representative embodiment shows the optical transducer 217 configured as an LED, for example, having first doped layer 212, active region 214 and second doped layer 216 stacked on the substrate 211, although the optical transducer 217 may be any other type of transducer configured to receive and/or send optical signals, without departing from the scope of the present teachings, as discussed above with reference to optical transducer 117. The first and second doped layers 212 and 216 are electrically connected to external circuitry via corresponding contact pads, indicated by representative contact pads 218 formed on a top surface of the substrate 211.

Likewise, the acoustic transducer device 220 is substantially the same as the acoustic transducer device 120 shown in FIGS. 1A and 1B, so the descriptions of various details will not be repeated. The acoustic transducer device 220 is mounted to the top surface of the optical transducer device 210 using any mounting or bonding techniques compatible with semiconductor processes, examples of which are discussed above, or grown through various semiconductor processes, such as sputtering, metal vapor deposition or the like. The acoustic transducer device 220 includes substrate 221, and a thin plate or membrane 231 and piezoelectric film stack 240 grown using semiconductor processes. A cavity 227 is fabricated under the membrane 231 by etching processes, such as dry etch or wet etch, for example. The acoustic transducer device 220 is substantially aligned with the optical transducer device 210 such that the optical transducer 217 mounted on the top surface of the substrate 211 (or grown) is positioned within the cavity 227 and the acoustic signals emitted and/or received by the optical transducer 217 pass through aperture 235 formed in the membrane 231, as discussed below. In various embodiments, the substrates 211 and 221 may have self-aligning features to facilitate assembly.

The piezoelectric film stack 240 includes a first electrode 242, a piezoelectric film 244 and a second electrode 246. In the depicted embodiment, the piezoelectric film stack 240 is substantially circular in shape, and forms an annular ring defining a center opening 245, through which a portion of a top surface of the membrane 231 is exposed. In alternative embodiments, the membrane 231 and/or the piezoelectric film stack 240 may be formed in different shapes, such as ovals, squares, rectangles and the like, without departing from the scope of the present teachings. Also, in alternative embodiments, the opening 245 may not extend entirely through the piezoelectric film stack 240. For example, the first electrode 242 and the piezoelectric layer 244 may be formed over the entire surface of the membrane 231, with the opening 245 only extending through the second electrode 246. In this configuration, the top surface of the piezoelectric layer 244 is exposed through the opening 245 in the piezoelectric film stack 240, as opposed to the top surface of the membrane 231, as shown in FIG. 2B. In this case, the aperture 235, discussed below, would extend through the first electrode 242 and the piezoelectric layer 244, as well as the membrane 231.

The membrane 231 is positioned on the substrate 221 over the cavity 227, which enables mechanical movement (e.g., vibration) of the exposed portion of the membrane 231, e.g., when the membrane 231 is actuated by piezoelectric film stack 240. The opening of the cavity 227 in the substrate 221 may be substantially circular, although it may have any of a variety of sizes and shapes, such as oval, square, rectangular and the like, without departing from the scope of the present teachings.

In the depicted embodiment, the membrane 231 is not solid, but rather includes the aperture 235 located substantially in the center of the membrane 231, through which optical signals L may pass. Accordingly, the aperture 235 enables the optical signals L emitted or received by the optical transducer 217 to pass through the membrane 231 with minimal absorption or front wave distortion. When the membrane 231 includes the aperture 235, the membrane 235 is not limited to a transparent or substantially transparent material, and thus may be formed of any types of materials compatible with semiconductor processes, including polysilicon, silicon nitride, silicon carbide, BSG, or the like. As discussed above, membrane 231 must be thin enough to enable mechanical movement or vibrations in response to electrical and/or acoustic signals. For example, the membrane 231 may be about 0.5 μm to about 2 μm thick at the exposed portion in order to vibrate at ultrasonic frequencies, although the thickness may vary to provide unique benefits for any particular situation or to meet application specific design requirements of various implementations, as would be apparent to one skilled in the art.

The size or diameter of the aperture 235 may vary to provide unique benefits for any particular situation or to meet application specific design requirements of various implementations, as would be apparent to one skilled in the art, e.g., depending on the type of optical transducer 217. For example, if the optical transducer 217 is a VCSEL, the diameter of the aperture 235 depends on the geometrical dispersion between the emitted light (beam divergency) and the separation between the laser and the membrane 231, in which case the diameter of the aperture 235 may be indicated as $2*d*\tan(\alpha)$, where d is the separation between the membrane 231 and the laser and $\alpha$ is the divergency angle. However, the aperture 235 may be designed smaller, such that there may be some diffraction, because the aperture 235 from the above calculation otherwise may be too large and affect the efficiency of the acoustic transducer device 220. In various embodiments, the diameter of the aperture 235 may be about 10 μm to about 100 μm, for example.

In alternative embodiments, the membrane 231 may include multiple apertures, having various sizes and shapes and being arranged in various patterns, for example, without departing from the scope of the present teachings. Multiple apertures may be used to produce a multiple beams in transmit mode or to selectively discriminate from a specific direction in receive mode.

In the representative embodiment depicted in FIG. 2A, the first electrode 242 is stacked on the top surface of the membrane 231, the piezoelectric layer 244 is stacked on a top surface of the first electrode 242, and the second electrode 246 is stacked on a top surface of the piezoelectric layer 244, as discussed above with respect to first electrode 142, piezoelectric layer 144 and second electrode 146. A passivation layer (not shown) may be optionally included on top and side surfaces of the acoustic transducer 230 in order to protect the other layers from humidity, and contaminants. A screen (not shown) can also be included to protect from debris. The first and second electrodes 242 and 246 are electrically connected to external circuitry via corresponding contact pads, indicated by representative contact pads 228 formed on the top surface of the substrate 220.

The integrated transducer device 200 has substantially the same element configurations and operates in substantially the same manner as discussed above with reference to integrated transducer device 100, except that the optical signals L pass through the open aperture 235 of the membrane 231, rather than traverse the actual material of the membrane 131. Accordingly, in the depicted embodiment, the optical transducer device 210 and the acoustic transducer device 220 emit and/or receive optical signals L and acoustic signals S, respectively, which propagate in collinear or substantially collinear directions.

Figure 3A:
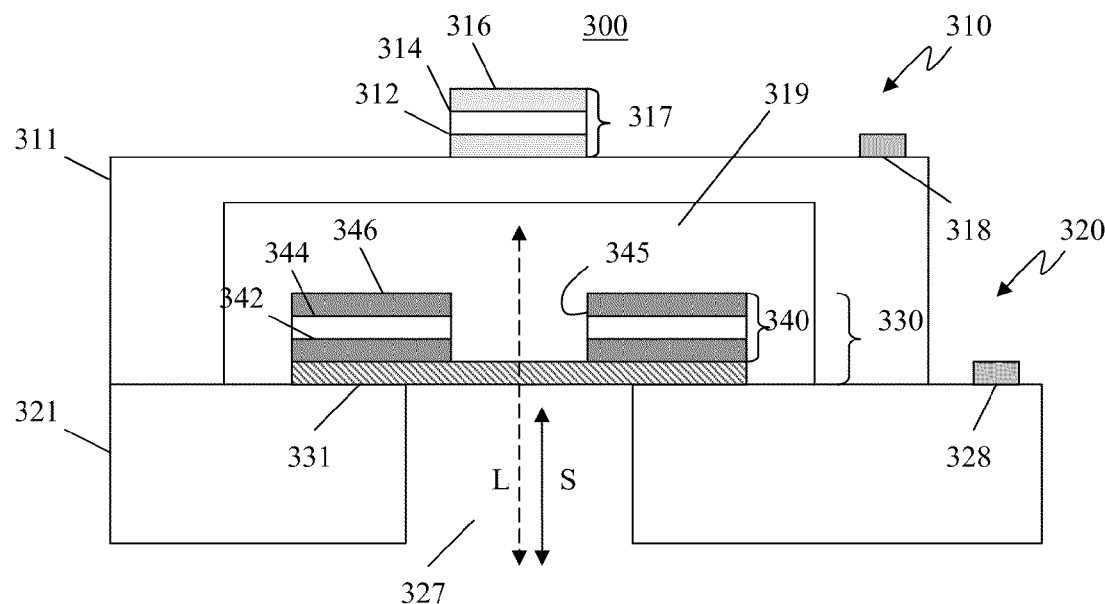
FIG. 3A is a cross-sectional diagram illustrating an integrated transducer device, according to another representative embodiment.
Figure 3B:
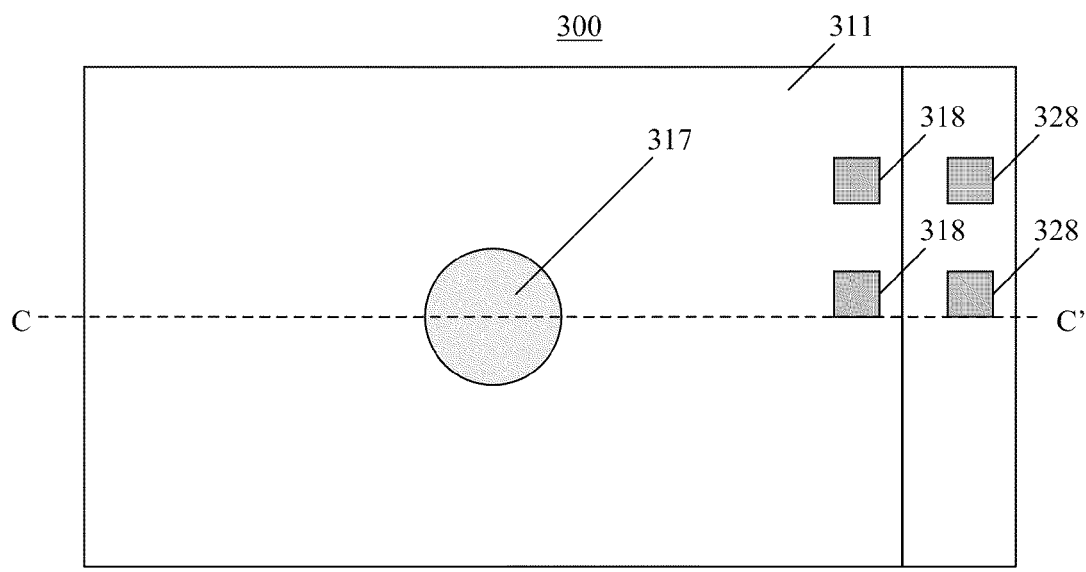
FIG. 3B is a top plan view illustrating an integrated transducer device, according to another representative embodiment.

FIG. 3A is a cross-sectional diagram illustrating an integrated transducer device, and FIG. 3B is a top plan view illustrating the integrated transducer device of FIG. 3A, according to another representative embodiment. More particularly, FIG. 3A shows a cross-sectional view of the transducer device depicted in FIG. 3B, taken along line C-C', according to a representative embodiment.

Referring to FIGS. 3A and 3B, integrated transducer device 300 includes vertically stacked acoustic transducer device 320 and optical transducer device 310. In the depicted embodiment, the integrated transducer device 300 is configured for bottom emission and/or reception of optical signals L and acoustic signals S, the propagation directions of which are collinear or substantially collinear. The integrated transducer device 300 differs from the integrated transducer devices 100 and 200 in that the optical transducer device 310 is mounted to a top surface of the acoustic transducer device 320, as opposed to the acoustic transducer device 120/220 being mounted to a top surface of the optical transducer device 110/210.

The optical transducer 317 is mounted to a top surface of the substrate 311, or grown through various semiconductor processes, such as sputtering, metal vapor deposition or the like. As discussed above with respect to the optical transducer 117, for example, the optical transducer 317 may be any type of transducer configured to receive and/or send optical signals, including an LED, a laser diode, a photodiode, a photoresistor, a vertical cavity laser, or the like, e.g., depending on whether the optical transducer device 310 is designed to transmit or receive optical signals, or both. The depicted representative embodiment shows the optical transducer 317 configured as an LED, for example, having first doped layer 312, active region 314 and second doped layer 316 stacked on the substrate 311, although the optical transducer 317 may be any other type of transducer configured to receive and/or send optical signals, without departing from the scope of the present teachings, as discussed above with reference to optical transducer 117. The first and second doped layers 312 and 315 are electrically connected to external circuitry via corresponding contact pads, indicated by representative contact pads 318, also formed on the top surface of the substrate 311.

In the depicted embodiment, the integrated transducer device 300 is configured for bottom emission and/or reception of optical signals L and bottom emission and/or reception of acoustic signals S. That is, the optical transducer 317 is configured to emit and/or receive optical signals L from the bottom, e.g., through cavity 319, membrane 331, and cavity 327, discussed below. Therefore, the substrate 311 must be formed of a material that is transparent or substantially transparent to the optical wavelength(s) of the optical signals L, such as BSG, for example, although other transparent material compatible with semiconductor processes may be incorporated without departing from the scope of the present teachings. Although shown as a singulated die including the optical transducer 317, it is understood that the substrate 311 may be part of a wafer containing multiple dies.

In an alternative embodiment, the integrated transducer device 300 may be configured for top emission and/or reception of optical signals L (not shown) and bottom emission and/or reception of acoustic signals S. That is, the optical transducer 317 is configured to emit and/or receive optical signals L from the top, while the acoustic transducer 330 is configured to emit and/or receive acoustic signals S from the bottom. The propagation directions of the optical signals L and the acoustic signals S are collinear or substantially collinear, although in opposite directions. However, because the optical signals L do not have to pass through the substrate 311 and the membrane 331 of the acoustic transducer 330, the optical signals L may propagate at various angles relative to the direction of propagation of the acoustic signals S.

Referring again to FIGS. 3A and 3B, the acoustic transducer device 320 is substantially the same as the acoustic transducer device 120 shown in FIGS. 1A and 1B, so the descriptions of various details will not be repeated. The acoustic transducer device 320 includes the substrate 321, and the thin plate or membrane 331 and piezoelectric film stack 240 grown using semiconductor processes. A cavity 327 is fabricated under the membrane 331 by etching processes, such as dry etch or wet etch, for example. The acoustic transducer device 320 is substantially aligned with the top mounted optical transducer device 310, such that the 317 acoustic transducer device 320 is located within the cavity 319 between the top surface of the substrate 321 and the bottom surface of the substrate 311, and over the cavity 327. In various embodiments, the substrates 321 and 311 may have self-aligning features to facilitate assembly.

The piezoelectric film stack 340 includes a first electrode 342, a piezoelectric film 344 and a second electrode 346. In the depicted embodiment, the piezoelectric film stack 340 may be substantially circular in shape, forming an annular ring defining a center opening 345 into the cavity 319, through which a center portion of the top surface of the membrane 331 is exposed. In alternative embodiments, the membrane 331 and/or the piezoelectric film stack 340 may be formed in different shapes, such as ovals, squares, rectangles and the like, without departing from the scope of the present teachings. Also, in alternative embodiments, the first electrode 342 and the piezoelectric layer 344 may not include an opening, but rather may be formed over the entire surface of the membrane 331. In this configuration, the top surface of the piezoelectric layer 344 is exposed through the opening 345 in the piezoelectric film stack 3240, as opposed to the top surface of the membrane 231. The optical signals emitted and/or received by the optical transducer 317 travel through the cavity 319 and pass through the membrane 331, as discussed above with reference to FIGS. 1A-2B, accessing the exterior of the integrated transducer device 300 via the cavity 327.

The membrane 331 is positioned on the substrate 321 over the cavity 327, which enables mechanical movement (e.g., vibration) of the exposed portion of the membrane 331, e.g., when the membrane 331 is actuated by piezoelectric film stack 340. The opening of the cavity 327 in the bottom surface of the substrate 321 is substantially circular, although it may have any of a variety of sizes and shapes, such as oval, square, rectangular and the like, without departing from the scope of the present teachings. In an embodiment, a gas permeable screen or mesh (not shown) may additionally cover the cavity 327 in order to provide additional protection of the internal components, particularly the exposed portion of the membrane 331. The screen or mesh may include multiple apertures sufficiently large to allow exposure to the ambient environment, yet small enough to limit the amount of contaminates that can enter the cavity 327.

In the depicted embodiment, the membrane 331 is solid, in that it does not include any apertures or openings. Accordingly, to enable the optical signals L emitted or received by the optical transducer 317 to pass through or traverse the actual membrane 331 with minimal absorption or front wave distortion, the membrane 331 is formed of a material that is transparent or substantially transparent to the optical wavelength(s) of the optical signals L and is relatively thin, as discussed above with reference to FIGS. 1A and 1B. Likewise, the membrane 331 and/or the piezoelectric film stack 340 enables mechanical movement or vibrations in response to electrical and/or acoustic signals at the exposed portion of the membrane 331 through the cavity 327. The thickness may vary to provide unique benefits for any particular situation or to meet application specific design requirements of various implementations, as would be apparent to one skilled in the art. In alternative embodiments, the membrane 331 may be formed of a material or otherwise have a structure and design for manipulating the optical signals L in a predetermined manner. For example, in various embodiments, the membrane 331 may be configured to diffract the optical signals L, randomly or at predetermined angle(s), or to shift polarization of the optical signals L.

Further, in alternative embodiments, the membrane 331 may include an aperture (not shown in FIGS. 3A and 3B) located substantially in the center of the membrane 331, through which optical signals L may pass. Accordingly, the aperture would enable the optical signals L emitted or received by the optical transducer 317 to pass through the membrane 331 with minimal absorption or front wave distortion. When the membrane 331 includes the aperture, the membrane 3317 is not limited to a transparent or substantially transparent material, as discussed above with reference to FIGS. 2A and 2B.

In the depicted representative embodiment, the first electrode 342 is stacked on the top surface of the membrane 331, the piezoelectric layer 344 is stacked on a top surface of the first electrode 342, and the second electrode 346 is stacked on a top surface of the piezoelectric layer 344, as discussed above with respect to first electrode 142, piezoelectric layer 144 and second electrode 146. A passivation layer (not shown) may be optionally included on a top surface of the second electrode 346, although such passivation layer may not be necessary if the cavity 319 between the acoustic transducer device 320 and the optical transducer device 310 is sealed. The first and second electrodes 342 and 346 are electrically connected to external circuitry via corresponding contact pads, indicated by representative contact pads 328 formed on the top surface of the substrate 320.

As stated above, the integrated transducer devices of the various representative embodiments (e.g., integrated transducer devices 100, 200 and 300) may be fabricated in accordance with various techniques compatible with semiconductor processes.

For example, referring to FIGS. 1A and 1B for purposes of illustration, the integrated transducer device 100 may be fabricated by fully forming both the optical transducer device 110 and the acoustic transducer device 120, and then mounting the acoustic transducer device 120 on the optical transducer device 110 by a wafer bonding technique. Representative bonding techniques may include direct bonding and bonding using interlayers. For example, direct bonding techniques include fusion bonding, e.g., bonding at an atomic level by extensive polishing of the substrates 111 and 121, anodic bonding, and the like. Also, interlayer bonding techniques include adhesion bonding, where an adhesive layer (not shown) is applied between the substrates 111 and 121, and metal bonding, where a gasket or solder joint (not shown) is applied between the substrates 111 and 121, e.g., using a microcap process, as described in U.S. patent application Ser. No. 12/430,966, filed Apr. 28, 2009, the subject matter of which is hereby incorporated by reference, and the like. In various embodiments, the substrates 111 and 121 of the wafers may be grown from different materials. The integrated transducer device 100 may be cut from the wafer into a separate die before or after the bonding process, depending on the embodiment.

The optical transducer device 110 and the acoustic transducer device 120 themselves likewise may be fabricated in accordance with any techniques compatible with semiconductor processes, without departing from the scope of the present teachings. For example, the acoustic transducer device 120 may be formed by initially etching a "swimming pool" or recess in the top surface of the substrate 121, e.g., by machining or by chemically etching the substrate 121 using photolithography. The recess may then be filled with a phosphosilicate glass (PSG) film, for example, followed by a chemical mechanical polish (CMP) to create a planar top surface. The acoustic transducer 130 is formed on the polished top surfaces of the substrate 121 and the PSG filled recess by layering the membrane 131 and the piezoelectric film stack 140. Back side etching may then be performed on the bottom surface of the substrate 121 to form a preliminary cavity directly below the PSG filled recess, which serves as an etch stop. The back side etch may include using a dry etch process, such as a Bosch process, for example, although various alternative techniques may be incorporated. The PSG material of the recess is then chemically released or etched, for example, using a wet etch process including HF etch solution, for example, to form the cavity 127.

Similarly, referring to FIGS. 3A and 3B, for example, the integrated transducer device 300 may be fabricated by fully forming both the optical transducer device 310 and the acoustic transducer device 320, and then mounting the optical transducer device 310 on the acoustic transducer device 320 by a wafer bonding technique, as discussed above. In alternative embodiments, the substrates 321 and 311 of the wafers may be grown from different materials. Also, the integrated transducer device 300 may be cut from the wafer into a separate die before or after the bonding process, depending on the embodiment.

In various embodiments, the cavity 319 may be formed in the substrate 311 of the optical transducer device 310 using back side etching. The back side etching may include a dry etch process, such as a Bosch process, for example, although various alternative techniques may be incorporated. In alternative embodiments, the cavity 319 may be formed by the horizontally disposed substrate 311 (with no back side cavity) as the top of the cavity 319, and separate vertically disposed gaskets forming the sides of the cavity 319. The gaskets may be formed between the substrates 321 and 311, e.g., using a microcap process, as described in U.S. patent application Ser. No. 12/430,966, filed Apr. 28, 2009, the subject matter of which is hereby incorporated by reference.

The various components, materials, structures and parameters are included by way of illustration and example only and not in any limiting sense. In view of this disclosure, those skilled in the art can implement the present teachings in determining their own applications and needed components, materials, structures and equipment to implement these applications, while remaining within the scope of the appended claims.

The invention claimed is:

1. An integrated transducer device, comprising:
an optical transducer; and
an acoustic transducer integrally joined with the optical transducer, the acoustic transducer comprising a membrane responsive to acoustic signals, at least a portion of the membrane covering an opening in the acoustic transducer aligned with the optical transducer, such that optical signals emitted or received by the optical transducer pass through the portion of the membrane covering the opening.

2. The device of claim 1, wherein a propagation direction of the acoustic signals emitted or received by the acoustic transducer is substantially collinear with a propagation direction of the optical signals emitted or received by the optical transducer.

3. The device of claim 2, wherein the membrane is formed from a material that is substantially transparent to the optical signals, such that the optical signals pass through the membrane by traversing the material of the membrane.

4. The device of claim 3, wherein the material of the membrane comprises borosilicate glass (BSG).

5. The device of claim 4, wherein the membrane has a thickness of about 0.2 µm to about 2 µm.

6. The device of claim 2, wherein the membrane defines an aperture, such that the optical signals to pass through the membrane by passing through the aperture of the membrane.

7. The device of claim 6, wherein the material of the membrane comprises polysilicon, silicon nitride, silicon carbide or borosilicate glass (BSG).

8. The device of claim 7, wherein the membrane has a thickness of about 0.5 µm to about 2 µm.

9. The device of claim 8, wherein the aperture has a diameter of about 10 µm to about 100 µm.

10. The device of claim 1, wherein the acoustic transducer is integrally joined with the optical transducer using a direct bonding technique.

11. The device of claim 1, wherein the acoustic transducer is integrally joined with the optical transducer using an interlayer bonding technique.

12. An integrated transducer device, comprising:
an optical transducer device configured to at least one of emit or receive optical signals, the optical transducer device comprising a first substrate and an optical transducer positioned on the first substrate; and
an acoustic transducer device configured to at least one of emit or receive acoustic signals, the acoustic transducer device comprising a second substrate defining a cavity and an acoustic transducer positioned on the second substrate, the second substrate being stacked on the first substrate such that the optical transducer is positioned within the cavity, wherein the acoustic transducer comprises:
a membrane positioned on the second substrate over the cavity; and
an annular piezoelectric film stack positioned on the membrane and defining a center opening, exposing at least a portion of the membrane, wherein the optical signals pass through the exposed portion of the membrane.

13. The device of claim 12, wherein the optical signals and the acoustic signals propagate substantially collinearly.

14. The device of claim 12, wherein the membrane is formed from a material that is substantially transparent to the optical signals, such that the optical signals to pass through the membrane by traversing the material of the membrane.

15. The device of claim 12, wherein the membrane defines an aperture, such that the optical signals to pass through the membrane by passing through the aperture of the membrane.

16. An integrated transducer device, comprising:
an acoustic transducer device configured to at least one of emit or receive acoustic signals, the acoustic transducer device comprising a first substrate defining a first cavity and an acoustic transducer positioned on the first substrate; and
an optical transducer device configured to at least one of emit or receive optical signals, the optical transducer device comprising a second substrate defining a second cavity and an optical transducer positioned on the second substrate above the second cavity, the second substrate being stacked on the first substrate,
wherein the acoustic transducer comprises a membrane positioned on the first substrate over the first cavity, and an annular piezoelectric film stack positioned on the membrane within the second cavity and defining a center opening, exposing at least a portion of the membrane, and
wherein at least a portion of the optical transducer is aligned with the center opening such that the optical signals pass through the second cavity and the exposed portion of the membrane.

17. The device of claim 16, wherein the optical signals and the acoustic signals propagate substantially collinearly.

18. The device of claim 16, wherein the membrane is formed from a material that is substantially transparent to the optical signals, such that the optical signals to pass through the membrane by traversing the material of the membrane.

19. The device of claim 16, wherein the membrane defines an aperture, such that the optical signals to pass through the membrane by passing through the aperture of the membrane.

20. The device of claim 16, wherein the first substrate and the second substrate are bonded together.

* * * * *